United States Patent

[11] 3,617,555

| [72] | Inventors | Irwin Ginsburgh<br>Morton Grove, Ill.;<br>Robert G. Will, Munster, Ind. |
|---|---|---|
| [21] | Appl. No. | 029,170 |
| [22] | Filed | Apr. 16, 1970 |
| [45] | Patented | Nov. 2, 1971 |
| [73] | Assignee | Standard Oil Company<br>Chicago, Ill. |

[54] METHOD AND APPARATUS FOR REMOVING OIL AND DEBRIS FROM WATER
18 Claims, 5 Drawing Figs.

[52] U.S. Cl. ................................................ 210/30,
210/40, 210/242, 210/400, 210/523, 210/DIG. 21
[51] Int. Cl. ........................................... E02b 15/04,
B01d 33/14
[50] Field of Search ............................... 210/30, 39,
40, 170, 242, 400, 496, 523, DIG. 21

[56] References Cited
UNITED STATES PATENTS
| 655,045 | 7/1900 | Bender .................... | 210/DIG. 21 |
| 2,793,756 | 5/1957 | Haltmeier ................ | 210/400 X |
| 3,314,540 | 4/1967 | Lane ....................... | 210/DIG. 21 |
| 3,357,562 | 12/1967 | Sherman, Jr. ............ | 210/523 X |
| 3,426,902 | 2/1969 | Kilpert et al. ........... | 210/DIG. 21 |
| 3,487,927 | 1/1970 | Yahnke .................... | 210/40 X |

FOREIGN PATENTS
| 308,940 | 6/1933 | Italy ....................... | 210/242 |
| 1,026,201 | 4/1966 | Great Britain ........... | 210/DIG. 21 |

*Primary Examiner*—Samih N. Saharna
*Attorneys*—Arthur G. Gilkes, William I. McClain and John J. Connors ABSTRACT: Oil and debris are removed from the surface of water using a revolving, partially submerged, endless brush belt. The brush belt has outwardly projecting bristles which ensnare the debris and pick up oil. Polypropylene bristles are preferred. The oil and debris are removed from the belt before the belt is reimmersed in the water. Alternatively, a brush-type drum could be used in place of the endless brush belt.

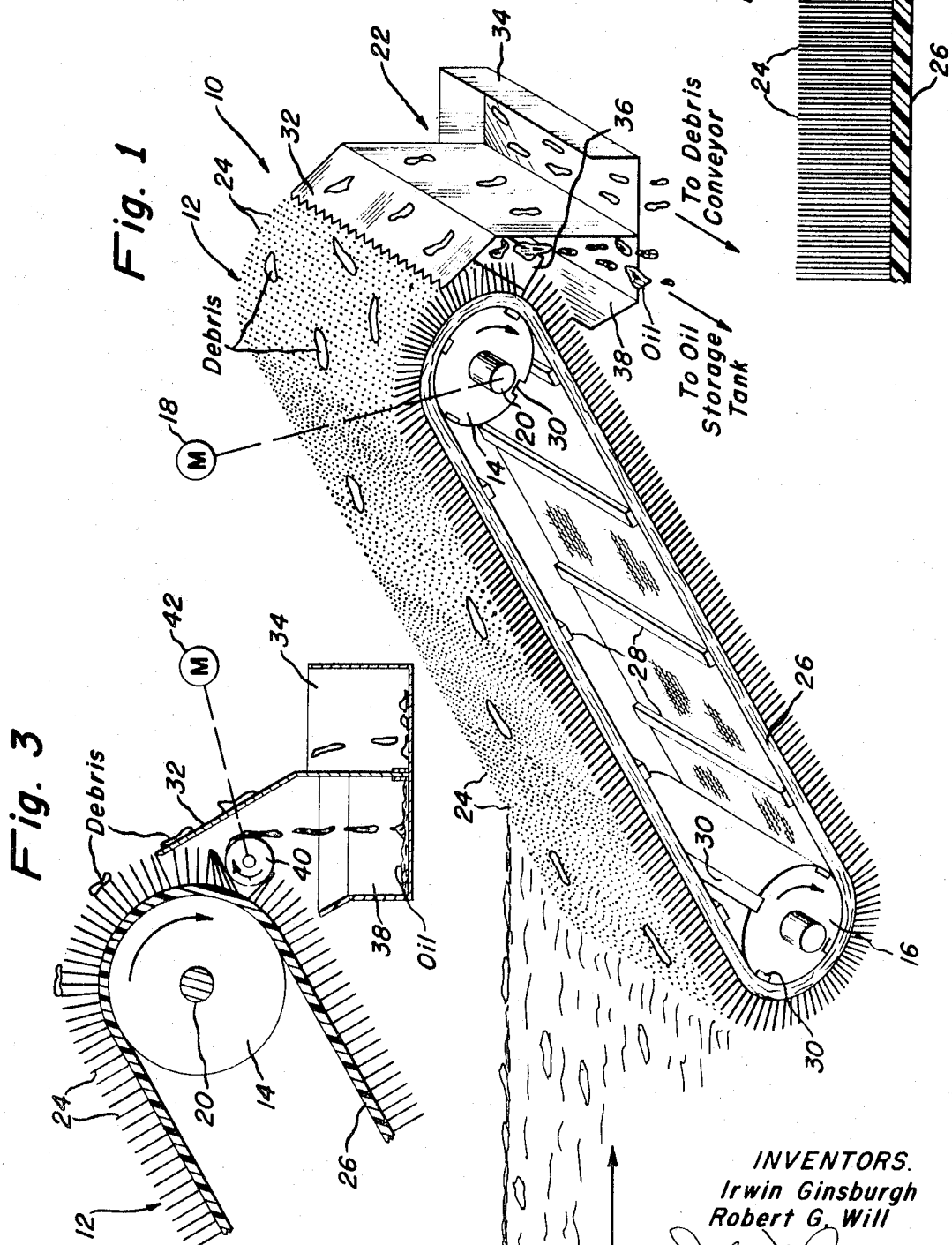

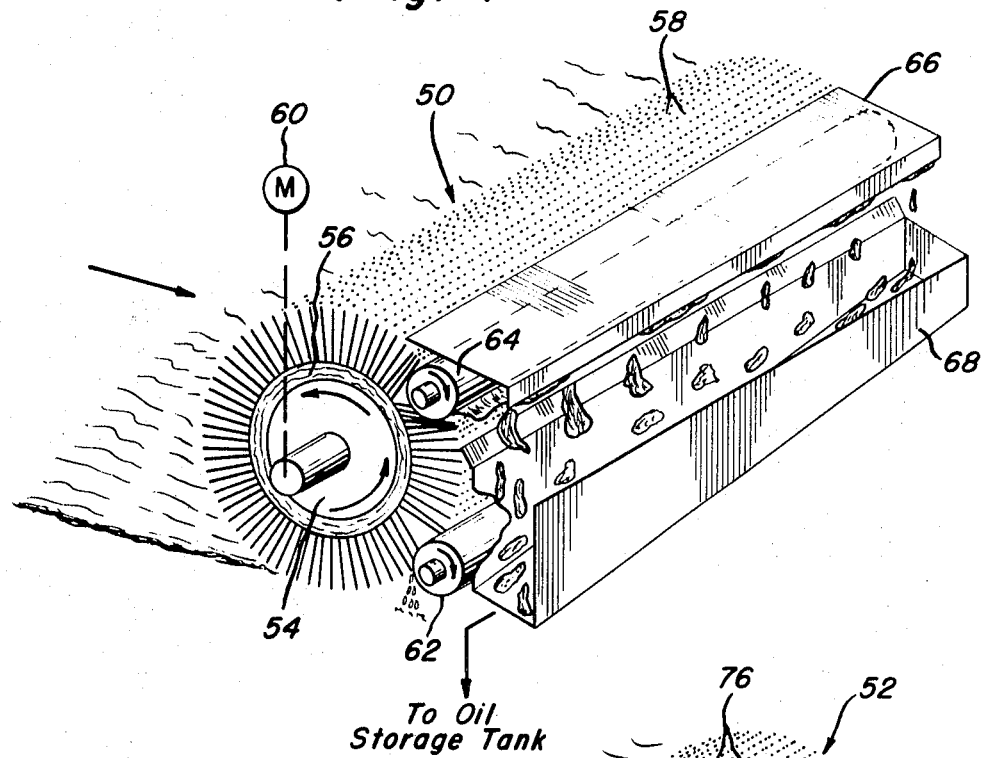
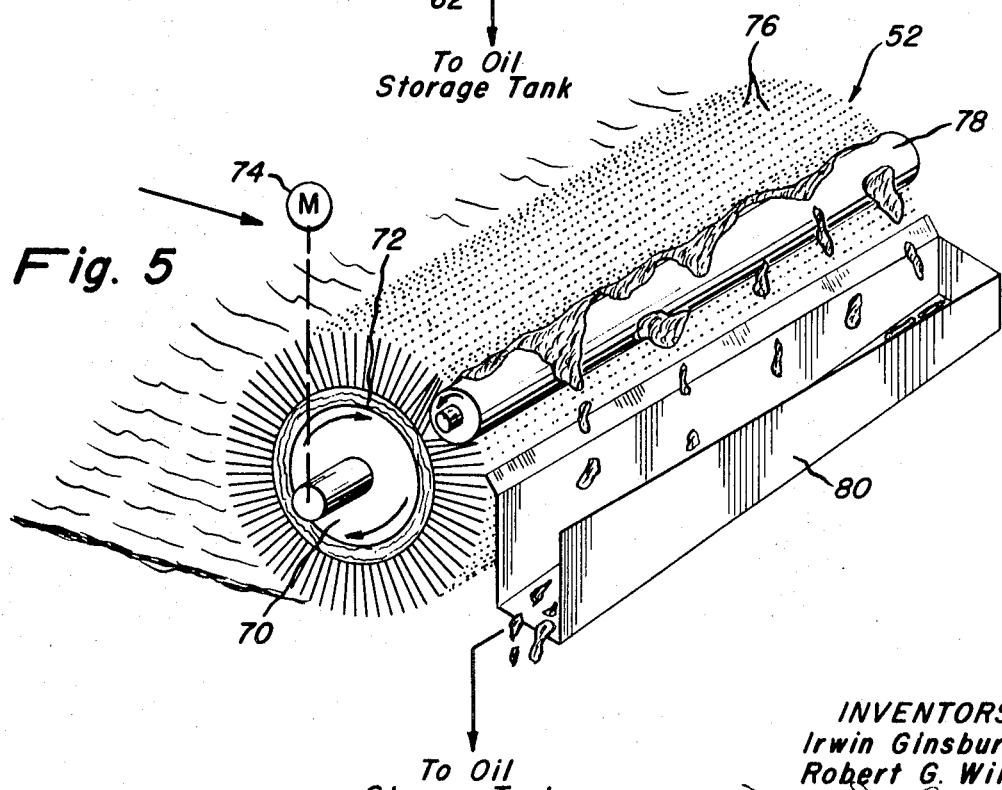

METHOD AND APPARATUS FOR REMOVING OIL AND DEBRIS FROM WATER

BACKGROUND OF THE INVENTION

The prior art discloses a wide variety of devices useful for removing oil from the surface of water. These include porous polyurethane drums and belts, metal drums and belts, or even smooth polyethylene drums and belts. These belt and drum devices are partially submerged in the water and revolved. Oil is absorbed or adsorbed by these revolving belts and drums, and is thus picked off the water's surface. However, the presence of debris floating on the water's surface severely impairs the operations of these devices. In fact, it is a common practice to spread straw, etc., on an oil slick to help contain the slick and prevent it from spreading; but this straw, etc., interferes with oil removal. Moreover, the prior art devices have difficulty in handling very heavy viscous oillike weathered crude or Bunker C oil. We have now invented a method for and an apparatus which picks up debris and heavy oils with facility, and the following drawings and accompanying description fully disclose the most important features of our invention.

DESCRIPTION OF DRAWINGS

FIG. 1 is a schematic perspective view showing our apparatus dipping into oil and debris floating on the surface of water.

FIG. 2 is an enlarged cross-sectional view of the brush belt used to pick up oil and debris.

FIG. 3 is a cross-sectional view showing an alternative way of removing oil from the brush belt shown in FIGS. 1 and 2.

FIG. 4 is a schematic perspective view with sections broken away of an alternate embodiment of our invention using a drum-type brush member.

FIG. 5 is yet another alternate embodiment of our invention also using a drum-type brush member.

DESCRIPTION OF PREFERRED EMBODIMENTS

Apparatus 10 of our invention, shown in FIG. 1, has the capacity to remove oily material (especially very viscous oils such as Bunker C) and debris from the surface of the water. The central feature of our apparatus 10 is collecting oily material and debris using endless brush belt 12, which is trained about drive roller 14 and idler roller 16. Drive roller 14 is above the water's surface and idler roller 16 is below the water's surface, so that belt 12 is partially submerged in the water. Moreover, idler roller 16 may be movably mounted so it can be raised or lowered to different depths. Mechanical driving means 18, coupled to drive shaft 20 of drive roller 14, moves belt 12 through a closed loop path so that the belt continuously dips into the water and is then withdrawn. Endless belt 12 travels downward through the water, around idler roller 16 and then upward to collect oil and debris. Debris and oil recovery means 22 above the water's surface removes oily material and debris from brush 12 and collects these removed materials.

As depicted in FIG. 2, belt 12 includes a multiplicity of bristles 24 which project outwardly from backing web 26. An important feature of our invention is that these bristles spread apart as belt 12 moves around rollers 14 and 16. Thus, with belt 12 in the water moving over idler roller 16, bristles 24 spread apart to entrap oily material and debris and close to hold this material and debris as the belt leaves the water. Likewise, as belt 12 moves over drive roller 14, bristles 24 spread apart to facilitate removal of oily material and debris from belt 12.

Bristles 24 are oil-wettable, durable, flexible, and they have a high fatigue strength. Moreover, they are of a sufficient length and there are a sufficient number so that they provide a massive surface area to which the oily material can adhere. Typically, each bristle 24 has a diameter ranging between about 0.010 and about 0.020 inch, preferably 0.012–0.018 inch, and a length ranging between about 0.5 and about 2.5 inches, preferably 1–2 inches. Typically, the number of bristles per square inch of web surface area ranges between about 200 and about 600, preferably between 300 and 500. Thus for example, a brush having 1⅛-inch long bristles of 0.012-inch diameter and 500 bristles per square inch will provide an oil-wettable surface 21.1 square inches per square inch of backing web. A brush having 1⅜-inch long bristles of 0.018 inch diameter and 320 bristles per square inch will provide an oil-wettable surface 24.9 square inches per square inch of backing web.

Bristles 24 may be synthetic fibers imbedded in a resinous backing web, for instance nonporous polyurethane. A nontufted construction is used, and bristles 24 are spread uniformly across backing web 26 to provide better brushing action, longer life and better cleanability. Almost every bristle works to pick up oil and debris. Suitable bristle materials are nylon and polypropylene, but polypropylene is more oil-wettable and less water-wettable than nylon, and consequently is preferred.

A preferred brush material is sold by 3M Company under the trade name BRUSHLON. Standard belt lacing fasteners may be used to tie the ends of a BRUSHLON strip together to make endless belt 12. BRUSHLON bristles are stiff enough to resist collapsing under the weight of the debris, yet flexible enough to allow debris to nestle down into the brush where it is held in place until conveyed to debris and oil recovery means 22. The thousands of tiny fingers formed by the bristles make an ideal collector for debris such as straw and other materials likely to be found floating in a harbor. BRUSHLON bristles provide a surface for snagging heavy viscous oil which is lifted from the water's surface almost like a sheet. BRUSHLON bristles also provide considerable oil-wettable surface area for very fluid oil, which will penetrate the brush to the backing and coat each bristle with a film of oil. In fact, the bristles are close enough so that surface tension fills the entire space between bristles for the medium viscous oils.

Preferably, apparatus 10 should have translational motion with respect to the water's surface. This may be accomplished by either mounting apparatus 10 on a floating watercraft which moves through the oily water, or holding apparatus 10 stationary in a moving stream of oily water. Idler roller 16 is upstream from drive roller 14 so that the upper surface of endless belt 12 is inclined with respect to the surface of the water. The preferred angle of inclination ranges between about 15° and about 45°, most preferably about 30°.

Mechanical driving means 18 turns drive roller 14 allowing belt 12 to travel along its course. To facilitate this, bars 28 or the like are fastened to the back of web 26, and idler and drive rollers 16 and 14 have grooves 30 therein which accommodate these bars. This provides a positive drive. Alternately, in place of idler and drive rollers 16 and 14, axles and sprockets may be used. These would be attached to each side of belt 12 with a chain running around the sprockets. This would also prevent slippage when belt 12 became oily. Mechanical driving means 18 preferably should be fitted with a variable speed reducer to allow running belt 12 at the optimum speed for any situation.

As mechanical driving means 18 revolves belt 12, the belt moves upward on the upstream side of apparatus 10 and downward on the downstream side. Oil and debris moving into contact with the upstream face of belt 12 is lifted off of the water onto this face. Water, which may also be picked up by the belt, can run down the upstream side of belt 12 to provide some oil-water separation. Then collected oil and debris is carried to debris and oil recovery means 22 which includes debris rake 32, debris bin 34, wiper-flicker blade 36, and oil trough 38. Debris rake 32 serves to comb the debris from the bristles 24. This debris then falls into bin 34. Large pieces of debris will simply fall into bin 34, but smaller pieces of debris must be combed out with rake 32. Bin 34 could be detachable so that it could be replaced when filled, or a conveyor can be rigged to continuously remove debris. Bin 34 should also be leakproof since some oil would accumulate on the debris, or it should permit the oil to flow into oil trough 38. As bristles 24 engage wiper.flicker blade 36, oil is wiped therefrom and then the bristles are flicked. Since bristles are resilient, they spring back to their normal position after disengaging wiper blade 36. Flicking also serves to remove oil. All removed oil falls into trough 38. Since heavy viscous oils would tend to clog trough 38, preferably the trough includes a screw pump (not shown) for transferring these oils to a suitable storage tank.

As shown in FIG. 3, an alternate means for removing the oily material from bristles 24 would be roller 40. This roller 40 would be driven by motor 42 so that its peripheral speed matched the peripheral speed of the surface of belt 12 passing over drive roller 14. Oil remover roller 40 would be positioned close to backing web 26 of belt 12 so as to squeeze out the maximum amount of oil and also hold the belt tightly against drive roller 14.

FIGS. 4 and 5 show alternate embodiments of our invention using a drum rather than a belt. These embodiments are not necessarily designed to collect debris and, in fact, we have found that the endless belt design is much more adapted for debris collection than the drum design. Nevertheless, the drum would in some instances be advantageous. Apparatus 50, shown in FIG. 4, is especially suited for use where drum elevation must be varied to accommodate rising or lowering levels of oil on the water's surface. In contrast, apparatus 52, shown in FIG. 5, is better suited for applications where the drum elevation relative to the water surface can be maintained constant so that the bristles only contact the oily material on the water's surface.

FIG. 4 shows drum 54 having removably mounted thereon brush sleeve 56 including oil-wettable bristles 58 projecting outwardly. Drum 54 is partially submerged in the oily water and driven by motor 60 to rotate counterclockwise as viewed in FIG. 4. The oily material adheres to bristles 58 and is carried upwardly toward rollers 62 and 64 which are in tangential contact with the brush's surface. Roller 62 is a water squeegee roller which is movably mounted on means not shown. Thus, roller 62 can be moved very close to the tips of bristles 58. Preferably, it should just about contact or just contact these tips. This will remove water which may be carried along with the oil. Oil squeegee roller 64 presses firmly against bristles 58 and it wipes and flicks the oil therefrom. These rollers 62 and 64 are driven in a clockwise direction as viewed in FIG. 4, and their surfaces are at the same peripheral speed as the sleev's surface. Oil flicked from sleeve 56 is trapped against upper splash deflector 66, which is sloped to allow collected oil to drain by gravity into oil-collecting trough 68. Oil wiped from sleeve 56 drains by gravity downward across the surface of the brush into oil-collecting trough 68.

FIG. 5 shows a simpler version of a drum unit, apparatus 52. This apparatus 52 includes drum 70 on which is mounted brush sleeve 72. Motor 74 drives drum 70 so that it rotates in a clockwise direction as viewed in FIG. 5. Oil is collected by bristles 76 of sleeve 72 and is carried to oil squeegee roller 78. This roller 78 rotates in a counterclockwise direction as viewed in FIG. 5, and wipes the oil from bristles 76. Removed oil then flows over roller 78 and falls into trough 80. Oil flicked from bristles 76 as them emerge from underneath roller 78 is also trapped in trough 80.

We claim:

1. A method for removing oily materials from the surface of water, comprising the steps of
    a. contacting said surface with means having oil-wettable plastic bristles projecting therefrom so that said oily materials adhere to said bristles, said bristles being made of a durable material having a high fatigue strength, and wherein each bristle has a diameter ranging between about 0.010 and about 0.020 inch, and the length of each bristle ranges between about 0.5 and about 2.5 inches, and the number of bristles per square inch ranges between about 200 and about 600, thereby being of sufficient length and number to provide a massive surface area to which the oily material can adhere; said bristles being stiff enough to resist collapsing under the weight of debris, yet flexible enough to allow debris to nestle down into the bristles and
    b. removing said means from said surface so that oily materials adhering to the bristles are thus picked up and removed from said surface.

2. The method of claim 1 wherein, after removing the means from the surface, oily material adhering to said bristles is removed therefrom to enable said means to again be brought into contact with said surface.

3. The method of claim 2 wherein removal of oily materials from the bristles is accomplished by flicking said bristles.

4. The method of claim 2 wherein removal of said oily materials from said bristles is accomplished by wiping the oily material off said bristles.

5. A method for removing oily material and debris from the surface of the water, comprising the steps of
    a. skimming the oily material and debris off said surface using a revolving, partially submerged member from which projects plastic bristles which are durable, oil-wettable, have a high fatigue strength, and wherein each bristle has a diameter ranging between about 0.010 and about 0.020 inch, and the length of each bristle ranges between about 0.5 and about 2.5 inches, and the number of bristles per square inch ranges between about 200 and about 600, thereby being of sufficient number and length to provide a massive surface area to which oily materials can adhere, said bristles, as said member revolves, being dipped into the water and then withdrawn so that the oily material adheres to the bristles and debris is ensnared by them, said bristles being stiff enough to resist collapsing under the weight of debris, yet flexible enough to allow debris to nestle down into the bristles; and
    b. removing debris and oily material from the bristles after said bristles are withdrawn from the water but before they are once again dipped into said water.

6. The method of claim 5 wherein said member is an endless belt mounted on an incline to allow at least some gravity separation of oil and water.

7. The method of claim 5 wherein said bristles are made of polypropylene.

8. Apparatus for removing oily materials from the surface of the water, comprising:
    a revolving member partially submerged in the water and having oil-wettable, durable plastic bristles projecting therefrom, and wherein each bristle has a diameter ranging between about 0.010 and about 0.020 inch, and the length of each bristle ranges between about 0.5 and about 2.5 inches, and the number of bristles per square inch ranges between about 200 and about 600, thereby being of sufficient number and length to provide a massive surface area to which the oily materials can adhere, said bristles being stiff enough to resist collapsing under the weight of debris, yet flexible enough to allow debris to nestle down into the bristles,
    means for revolving said member so that the bristles dip into the water and pick up oily material and are then withdrawn; and
    means which removes and collects oily material from the bristles after said bristles are withdrawn but before they are again dipped into the water.

9. The apparatus of claim 8 wherein the means for removing the oily material from the bristles includes blade means which is in tangential contact with the bristles so that the bristles are wiped and then flicked as they emerge from engagement with said blade means.

10. The apparatus of claim 8 wherein the means for removing the oily material includes roller means which engage the bristles and wipe and flick the oily material therefrom.

11. The apparatus of claim 8 wherein the revolving member is a drum.

12. The apparatus of claim 8 wherein the revolving member is an endless belt.

13. The apparatus of claim 8 wherein the bristles are made of polypropylene.

14. Apparatus for removing oily material and debris from the surface of water, comprising:

a revolving member partially submerged in the water and having oil-wettable, durable plastic bristles projecting therefrom, said plastic bristles serving as means to pick up debris, and wherein each bristle has a diameter ranging between about 0.010 and about 0.020 inch, and the length of each bristle ranges between about 0.5 and about 2.5 inches, and the number of bristles per square inch ranges between about 200 and about 600, thereby being of sufficient length and number to provide a massive surface area to which the oily material can adhere, said bristles being stiff enough to resist collapsing under the weight of debris, yet flexible enough to allow debris to nestle down into the bristles;

means for revolving said member so that the bristles dip into the water, pick up debris and oily material and are then withdrawn from the water;

means above the water's surface which remove debris from the bristles and collect said removed debris; and means above the water's surface which remove oily material from the bristles and collect said removed oily material.

15. The apparatus of claim 14 wherein the means for removing the debris from the bristles includes a member having a plurality of fingers which engage bristles and comb out the debris therefrom.

16. The apparatus of claim 14 wherein the means for removing oily material from the bristles includes a member which will wipe the bristles and then flick them to remove oil therefrom.

17. The apparatus of claim 14 wherein the revolving member is an endless belt mounted on an incline relative to the water's surface.

18. The apparatus of claim 14 wherein the bristles are made of polypropylene.

* * * * *